US00RE38095E

(19) United States
(12) Reissued Patent
Fabris

(10) Patent Number: US RE38,095 E
(45) Date of Reissued Patent: Apr. 29, 2003

(54) SIZING ROLL STAND FOR A STEEL MILL

(76) Inventor: Mario Fabris, 188 North Service Road, Grimsby, Ontario (CA), L3M 4E8

(21) Appl. No.: 09/790,567

(22) Filed: Feb. 23, 2001

Related U.S. Patent Documents

Reissue of:
(64) Patent No.: 5,911,784
Issued: Jun. 15, 1999
Appl. No.: 09/174,115
Filed: Oct. 19, 1998

(51) Int. Cl.[7] ..... B21B 39/20
(52) U.S. Cl. ..... 72/250; 72/227
(58) Field of Search ..... 72/78, 224

(56) References Cited

U.S. PATENT DOCUMENTS

| | | | | |
|---|---|---|---|---|
| 1,697,739 A | * | 1/1929 | Sussman | 72/224 |
| 2,168,340 A | * | 8/1939 | Hill | 72/78 |
| 3,765,214 A | * | 10/1973 | Boehmer | 72/250 |
| 4,039,107 A | * | 8/1977 | Boley | 72/250 |
| 4,194,381 A | * | 3/1980 | Joekel | 72/224 |
| 4,790,164 A | * | 12/1988 | Rothe | 72/250 |
| 5,363,682 A | * | 11/1994 | Takeda et al. | 72/224 |
| 6,018,974 A | | 2/2000 | Potthoff et al. | |

FOREIGN PATENT DOCUMENTS

| | | |
|---|---|---|
| JP | 58188509 A | 11/1983 |
| JP | 61107406 | 7/1986 |
| JP | 1262014 | 10/1989 |
| JP | 233922 | 9/1990 |
| JP | 341848 | 9/1991 |
| JP | 570707 | 9/1993 |
| JP | 839104 | 2/1996 |
| JP | 10180336 | 7/1998 |

* cited by examiner

*Primary Examiner*—Lowell A. Larson
(74) *Attorney, Agent, or Firm*—Edward H. Oldham

(57) ABSTRACT

An assembly for producing a finished shape for a rod after the last rolling stage of a multi strand steel mill. This apparatus provides an operation for correcting minor surface irregularities and shape distortion of the rod as it exits from the finishing roll stand. The apparatus consists of four rollers mounted in an assembly which resembles a roller entry guide except that the rollers are capable of producing changes in shape of a work product passing therethrough. The orientation of the roller axis is slowly and constantly changed to prevent wear distortion of the rollers which may result when the rollers are required to roll a malformed product from fixed roller axes. The rollers may be driven in some circumstances.

14 Claims, 3 Drawing Sheets

SIZING ROLL STAND FOR A STEEL MILL

Matter enclosed in heavy brackets [ ] appears in the original patent but forms no part of this reissue specification; matter printed in italics indicates the additions made by reissue.

BACKGROUND OF THE INVENTION

Modern steel mills are required to produce a finished product which must meet critical size requirements within a very small tolerance. Most rod mills are capable of producing a finished product within a given tolerance range until the steel work product wears the contours of the forming rolls so that the finished product has a shape which is not acceptable to a customer. To correct minor irregularities in shape, the steel mill industry has, at times, employed a process known as peeling, wherein a finished rod is pulled through a die to remove portions of the surface of the rod to restore the shape of the finished product to one that is now acceptable to a customer and the surface is now true and free of imperfections. The peeling process is capable of correcting for only small deviations in the gauge of the finished product.

SUMMARY OF THE INVENTION

This invention provides a rolling assembly in which at least three and preferably four equally spaced rollers are mounted in a housing about an axis through which a steel rod or wire passes. The rollers are mounted in a robust assembly which can exert substantial pressure on the rollers to change the shape of the work to compensate for minor shape deviations in the shape of the work product caused by wear of the rollers in the reducing mill. The assembly is provided with a roller positioning device which moves the rollers in the roller assembly in concert toward and away from the axis of the work piece passing between the rollers.

At the same time, the roller assembly in which the rollers are mounted is pivotable through a predetermined angle (say 45°) to change the orientation of the entire roller assembly with respect to the workpiece passing therethrough. In this instance, premature wear of the roller surfaces of the rollers of the sizing guide is minimized because the rollers of the sizing guide are constantly changing position with respect to the surface of the work product.

The cross sectional shape of a work product exiting from a finishing stand of a multi stand steel mill is dependent upon the accuracy of the profile existing in the rollers of the mill stand. When the rollers of the mill have worn to the extent that the work product has a gauge or shape which lies outside the acceptable tolerance range and no further corrective actions involving roller adjustment are capable of restoring the work product to an acceptable gauge, the rollers in the mill must be replaced because the surface contours of the reducing rollers have undergone wear and abrasion by the constant passage of the work product between the reducing rolls.

Some wear patterns in the rollers are predictable, depending on the rolling process to which the mill stand rollers are subjected and most operators of modern steel mills instinctively known that shape distortion of the finished product will inevitably result. At times, the distortion in work product shape may be corrected by further processing the work product to remove such distortion after passage through the final mill stand (if the distortion is not too great). The worn rolls in the mill may then continue to be used to produce a useful work product beyond the usual wear period due to the correction applied to the work product. In the past this correction has usually been accomplished by "peeling" some metal from the surface of the malshaped workpiece using a die such that small shape deformations may be removed by this process.

The sizing roll stand of this invention is capable of restoring the exterior shape of a malformed work product exiting from a steel mill to an acceptable size and shape. The apparatus of this invention is capable of providing corrections for the same shape distortions as the "peeling" process to which reference has been made, but at a very high speed. The rollers of the sizing roll stand may or may not be externally driven.

PERTINENT PRIOR ART

DESCRIPTION OF THE PREFERRED EMBODIMENT

Figure 1:
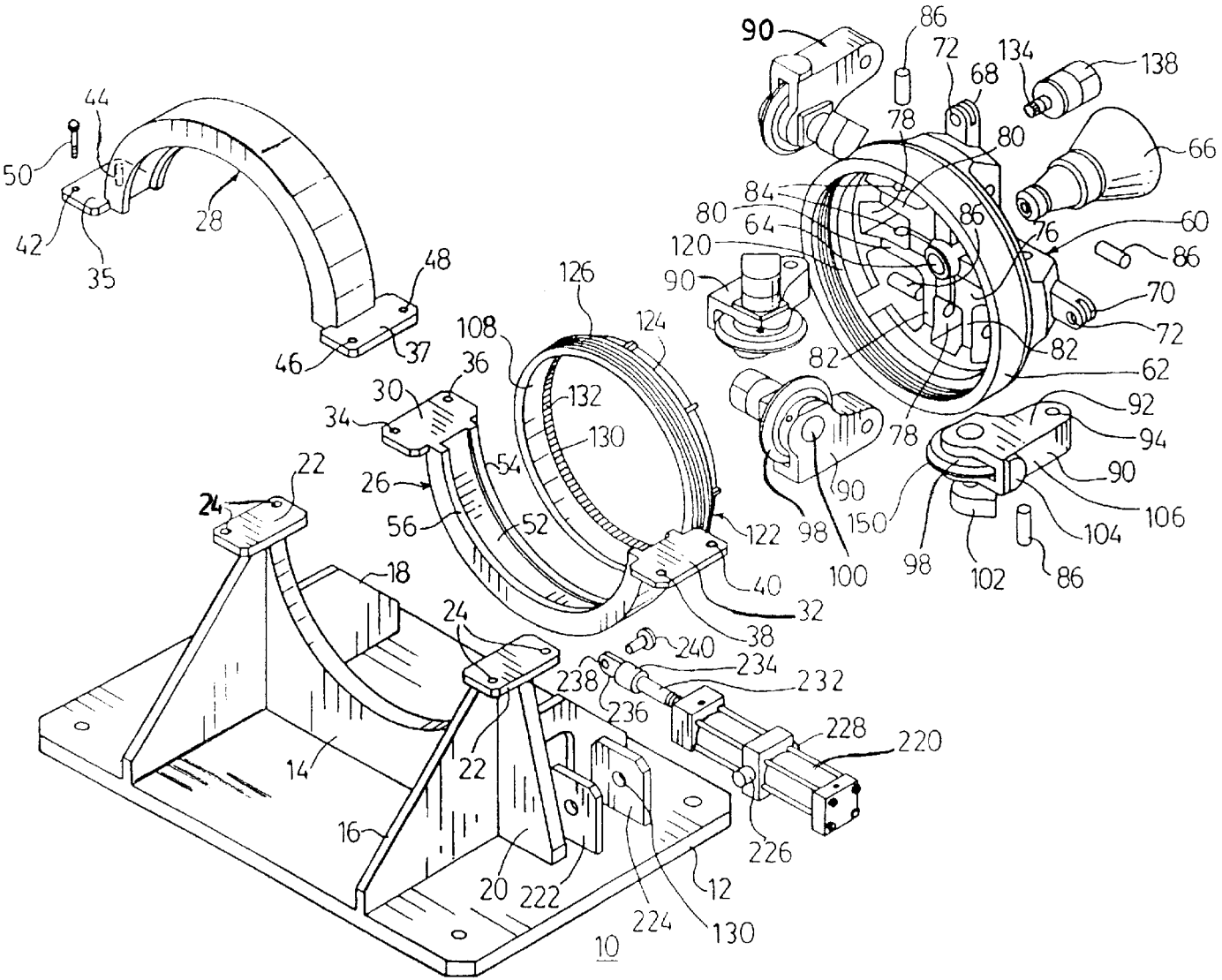
FIG. 1 is an exploded perspective view of the device of FIG. 1.
Figure 2:
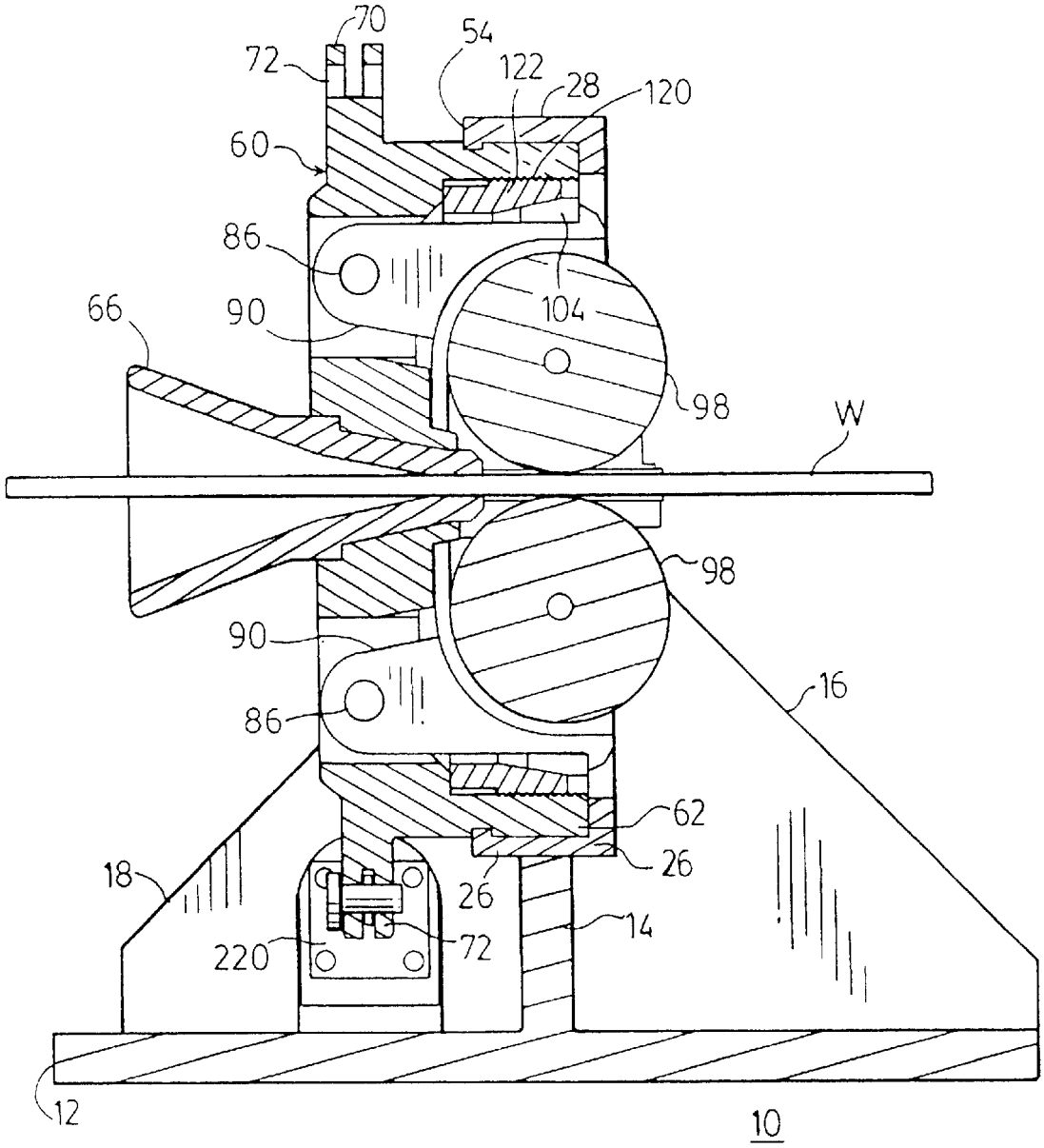
FIG. 2 is a sectional elevation of the sizing roller device of this invention.

Referring now to FIGS. 1 and 2, a sizing device 10 is shown having a supporting base 12 having a rigid semicircular flange 14 secured thereto by means of gussets 16, 18, 20. A pair of faceplates 22 are welded to the flange 14 at the intersection of gussets 16 and 20. Each faceplate has a pair of holes 24 for mounting the pair of stationary split half rings 26, 28 therein.

Split rings 26 and 28 have a pair of faceplates 30, 32 and 35, 37 formed therein to permit mounting the pair of split half rings 26, 28 on supporting base 12 and faceplates 35, 37 have holes 42, 44 and 46, 48 formed therein. The split rings 26, 28 are made to be joined together at the faceplates 30 and 35 and 32 and 37 and the complete assembly is bolted onto faceplates 22 of base 12 with four bolts (such as 50) passing through holes such as 42, 34 and 24 to hold split rings 26 and 28 together and firmly in place on base 12.

The assembled split rings provide a captive cylindrical recess 52 formed between the annular flanges 54 and 56 for receiving the somewhat circular housing 60 therein. (Note that flange 56 has substantially more depth than flange 54.) Housing 60 has a somewhat cylindrical boss 62 which is made to cooperate with split rings 26 and 28 which form a housing in recess 52 in which the cylindrical boss 62 may rotate.

The housing 60 is provided with a central bore 64 to which guide 66 is frictionally mounted.

Housing 60 is shown with 2 extending arms 68 and 70 protruding therefrom (two more identical arms are located opposite arms 68 and 70 on the housing 60). The exterior portion of each of the arms 68 and 70 is formed into a clevis type device which is provided with a bore 72 therein.

Housing 60 is provided with a cruciform shaped inner structure 76 at the center of which is bore 64. The cruciform structure comprises 4 substantially identical recesses 78 formed by parallel walls 80, 82 arranged in orthogonal relationship about bore 64. Each pair of walls 80, 82 houses a bore 84 for receipt of pins such as 86.

Each recess 78 is of a size and shape to receive a roller assembly 90 (of which there are four) in a restrained pivoting relationship. Each assembly 90 comprises a pivot arm 92 having a bore 94 in one end thereof. At the opposing end of pivot arm 90 is a sizing roller 98 mounted for rotation (in this instance driven) about an axis determined by bore 100. Suitable bearings are provided in assembly 90 to withstand the heavy pressures applied to roller assembly 90 during a sizing operation.

Figure 3:
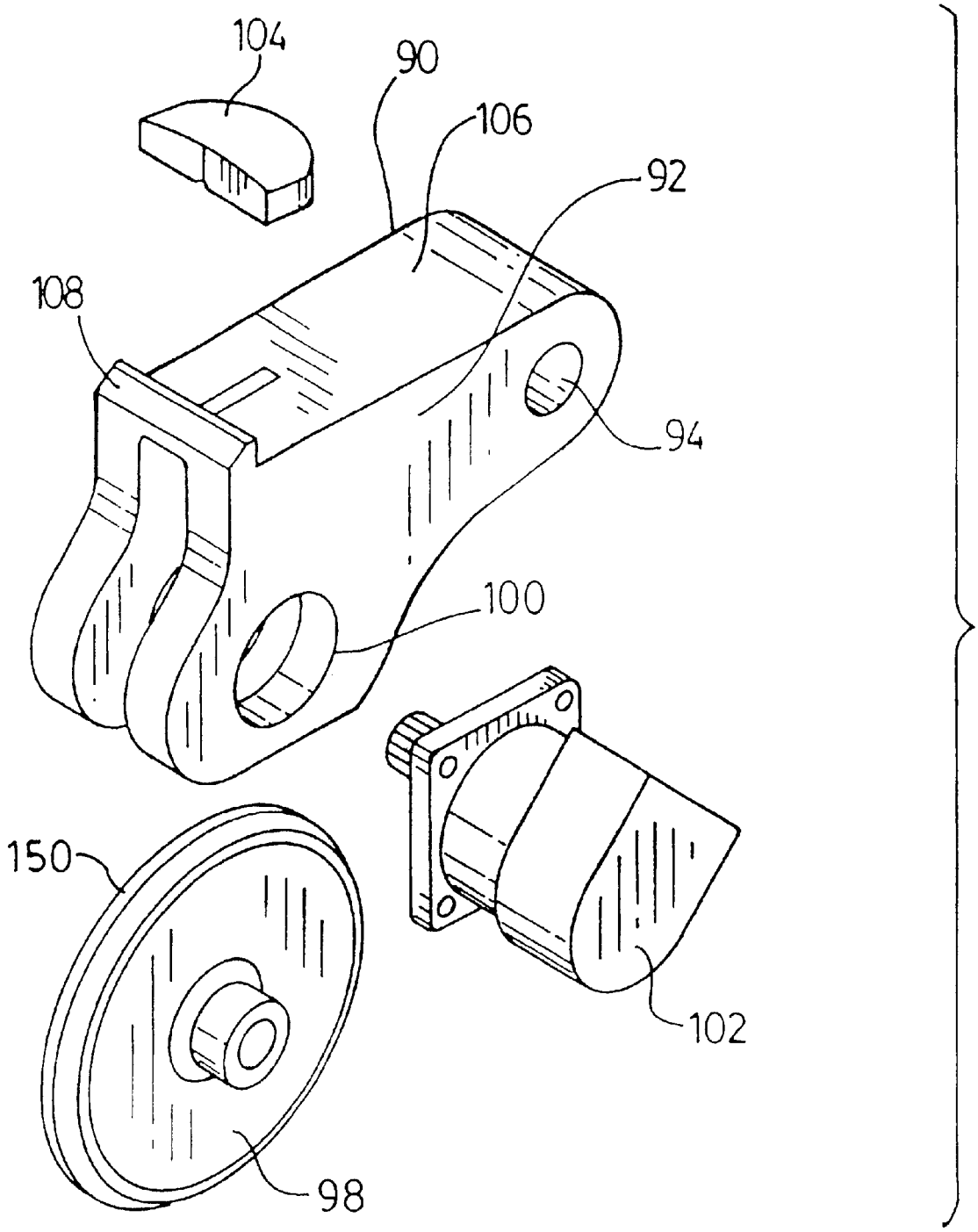
FIG. 3 is a perspective view of an exploded roller assembly of this invention.

A drive motor 102 is applied to rollers 98 (in this instance) to assure that rollers 98 are rotating when the work product makes its entry to the bight formed by the wheels 98. Each roller assembly 90 fits into its respective recess 78 with a precise fit to avoid slopiness, and to prevent unnecessary lateral motion of each assembly 90 along the axes of pins 86. Each roller assembly 90 is provided with a bearing pad 104 which is applied to the flat surface 106 of assembly 90. An abutment 108 provides a guide for mounting pads 104 on the wheel assemblies 90 (see FIG. 3).

The housing 60 is provided with an internal thread 120 for receiving collar 122 which has a cylindrical outer portion 124 of which 126 is threaded to mate with thread 120. An opposing conical surface 128 is provided in the interior of collar 122. Conical surface 128 is shaped to mate with pads 104 of the roller assemblies 90.

A second internal surface 130 of collar 122 is provided with a set of gear teeth 132. Gear teeth 132 are provided for engagement of toothed pinion 134 of gear motor 136. Gear motor 136 is mounted on housing 60 so that the gears 134 and 132 are in constant engagement.

A hydraulic cylinder 220 is mounted in mounting plates 222, 224 on base 12. Cylindrical bosses 226, 228 of cylinder 220 are mated in bore 130 of plates 226, 228. Piston rod 232 of cylinder 220 terminates in fitting 234 which has a projection 236 bearing a bore hole 238 therein.

The projection 236 is provided to fit into one of the clevis members 68 of arms 70 of housing 60 and receive a pin 240 through apertures 72 and 238 to secure piston rod 232 to one of the arms 70 of housing 60. As piston rod 232 is moved in and out of cylinder 220, the housing 60 rotates within recess 52 of housing 56 formed by the split rings 26 and 28.

The sizing guide 10 functions as follows: A work product (rod, wire, etc.) is fed into funnel shaped guide 66 and passes into the bight between the four rollers 98 mounted in roller assemblies 90. The rollers 98 have a predetermined external contour 150 to produce the desired shape of the work product passing therebetween. Collar 122 is rotated by drive motor 138 to move the collar 122 axially in housing 60 along the threaded surface 120 to bear on bearing pads 104 of roller assemblies 90 to wedge the rollers 98 inwardly into a contacting relationship with the work product.

If for some reason the shape of the work product has deviated from the preset gauge required, the sizing device 10 may be used to bring the work product back to a size that is within an acceptable tolerance by applying substantial pressures to the wheel assemblies 90. The conical surface 108 of collar 122 serves to wedge the wheel assemblies in an inward direction.

Usually the rolls of a mill stand wear in a predictable manner over a period of time, depending on the deformation being produced by the mill rolls in the work product passing therebeween. The work product usually exits from the last mill stand having a peculiar and consistent shape which has a particular orientation with respect to the mill stand. Because of this, any deviation from the desired cross sectional shape of the workpiece tends to be continuously passed from the mill stand with a consistent physical orientation, into the sizing device of this invention.

Depending on the deviation of the workpiece from the desired gauge, the sizing device of this invention will provide correction to the shape of the workpiece exiting from this device and prolong the life of rollers 98 of the sizing guide 10. Because the finished product of a steel mill exits with any shape deformation of the work product always in the same orientation with respect to the direction of travel of the work product, this device is made to rotate the entire roller assembly (encased in housing 60) through an angle of about 45° during operation. This assures that the rollers 98 of the roller assemblies 90 continuously contact different surface configurations of the moving work product so that the rollers 98 wear evenly. The working life of rollers 98 is significantly increased as a result.

While changes and deviations from the disclosed device will no doubt occur to those skilled in the art, the applicant prefers to limit the scope of this invention by the ambit of the following claims.

I claim:

1. A roller sizing guide having a [set] *plurality* of *guide* rollers mounted in a housing *to form a guide roller assembly* for contacting *and guiding* a workpiece traveling through said guide along a central axis of said housing, said housing *and roller assembly* being rotatably supported on a suitable support means to permit said housing *and roller assembly* to rotate about said central axis,

[said rollers] *said roller assembly comprising a plurality of levers pivotally* being mounted *on pivots located at one end of each lever* in said housing, *each lever having a roller mounted in the end remote from the pivot, said pivoted levers serving* to permit said rollers to move *in an arc* toward or away from said central axis,

*a pressure bearing pad for each lever located at the roller end of the roller assembly over the point of contact of each roller and workpiece,* roller positioning means for said rollers *mounted in said housing* to *apply a* force *to* said rollers *at said pressure bearing pad* to move *said rollers* in concert to contact said workpiece to alter the shape of said workpiece at is travels through said guide.

2. A roller sizing guide as claimed in claim 1 wherein said roller positioning means includes a common wedging [means] *ring surrounding said guide roller assembly* for producing simultaneous and equal *pivotal* movement of said rollers in said housing toward said workpiece.

3. A roller sizing guide as claimed in claim 1 wherein a housing drive means is mounted on said structure to produce [rotation] *oscilliatory motion through a predetermined arc* of said housing *and said roller assembly* during passage of said workpiece therethrough.

4. A roller sizing guide as claimed in claim 3 wherein said roller positioning means includes a common wedging means for producing simultaneously and equal movement of said rollers in said housing toward said workpiece.

5. A roller sizing guide as claimed in claim 4 wherein *all of* said rollers are mechanically driven.

6. A roller sizing guide as claimed in claim 5 which includes a funnel shaped guide for feeding said workpiece along said axis to said set of rollers.

7. A roller sizing guide for producing shape changes in a workpiece passing along a central axis of said guide, said guide having a rotatable housing mounted in a suitable framework supported by a base, said housing having a cylindraceous outer surface, said framework including means to contact said cylindraceous outer surface and permit said housing to rotate in a plane orthogonal to said axis, said housing having means to mount at least three roller assemblies in said housing, said roller assemblies comprising lever means having a suitable roller mounted for rotation at one end thereof, pivot means in said lever means at an end remote from said roller, said pivot means being mounted in said housing to provide for pivotally mounting said rollers at equally spaced intervals about said axis, *bearing pads mounted on said lever means at a location on said lever means remote from said pivot means,* adjustable pressure lever contacting means *applying pressure to bearing pads on said lever means* causing said [levers] *lever means* to exert pressure on said roller assemblies *at points above said roller* to cause said rollers to contact said workpiece and produce surface changes to said workpiece.

8. A roller sizing guide as claimed in claim 7 wherein housing rotation means is connected to said housing to cause continued rotational oscillation of said housing within predetermined limits.

9. A roller sizing guide as claimed in claim 8 wherein said adjustable pressure lever contacting means comprises a pressure ring having an exterior threaded surface for threadably engaging a threaded surface in said housing, said pressure ring being provided with a conical inner surface to engage pressure pads on said roller assemblies for adjustably applying pressure to said pressure pads of said roller assemblies as said pressure ring rotates in said housing.

*10. A sizing guide assembly for guiding and contacting a workpiece passing through said guide assembly to produce minor shape changes in said workpiece as it passes through a central axis of said guide assembly,*

*said guide assembly comprising:*

*a stationary support for mounting a rotatable housing within said stationary support to permit said housing to rotate about said central axis,*

*said housing comprising a pair of cooperating members for mounting and adjusting the position of a plurality of guide rollers in a roller assembly in said sizing guide,*

*a first member of said pair having an external cylindrical surface which cooperates with said stationary support to permit said first member to rotate in a controlled manner within said support member,*

*said first member having means to mount a plurality of pivot arms therein, each pivot arm having a guide roller mounted thereon for contacting said workpiece, said pivot arms and guide rollers being moved in concert by a second member which is mounted within said first member so as to permit said second member to execute translational motion within said first member along said central axis in the presence of a suitable stimulus,*

*said second member having a conical interior surface which simultaneously engages said pivot arms to move said pivot arms and said rollers toward said workpiece as said second member translates.*

*11. A sizing guide assembly as claimed in claim 10 wherein said second member is of a ring shaped configuration and has a threaded peripheral surface opposite said conical surface, wherein said threaded peripheral outer surface of said second member engages a corresponding mating threaded interior surface in said first member.*

*12. A method of producing minor changes to a steel rod or wire as it passes through a sizing guide comprising:*

*providing said guide with a housing for mounting a plurality of rollers therein for contacting said rod or wire as it passes through said guide,*

*providing pressure means for urging said rollers in concert toward said rod or wire as it passes therethrough,*

*providing a support means to capture said housing within said support means in such a manner as to constrain said housing to rotational movement about said rod or wire as it passes therethrough,*

*driving means associated with said housing for causing oscillatory rotational motion of said housing and rollers about said rod or wire as said rod or wire passes through said guide.*

*13. A method as claimed in claim 12 in which each roller is mounted within said housing on a pivot arm, and said pressure means comprises a pressure ring mounted in said housing, wherein said pressure ring is provided with an internal conical surface which engages each pivot arm simultaneously.*

*14. A method as claimed in claim 13 in which said pressure ring executes translational motion upon suitable stimulation to change the pressure on said pivot arms and said rollers.*

* * * * *